United States Patent
Wang

(10) Patent No.: US 10,274,179 B1
(45) Date of Patent: Apr. 30, 2019

(54) FLASHING ORNAMENT APPARATUS

(71) Applicant: Hua-Cheng Pan, Tainan (TW)

(72) Inventor: Chih-Liang Wang, Tainan (TW)

(73) Assignee: Hua-Cheng Pan, Tainan (TW)

( * ) Notice: Subject to any disclaimer, the term of this patent is extended or adjusted under 35 U.S.C. 154(b) by 0 days.

(21) Appl. No.: 15/892,425

(22) Filed: Feb. 9, 2018

(51) Int. Cl.
| | |
|---|---|
| *F21S 10/00* | (2006.01) |
| *F21V 3/02* | (2006.01) |
| *F21V 8/00* | (2006.01) |
| *A47G 33/08* | (2006.01) |
| *F21V 23/04* | (2006.01) |
| *F21W 121/00* | (2006.01) |
| *F21Y 115/10* | (2016.01) |
| *F21V 23/02* | (2006.01) |

(52) U.S. Cl.
CPC ............ *F21V 23/0407* (2013.01); *F21V 3/02* (2013.01); *F21V 23/02* (2013.01); *G02B 6/006* (2013.01); *G02B 6/009* (2013.01); *G02B 6/0076* (2013.01); *G02B 6/0088* (2013.01); *A47G 2033/0827* (2013.01); *F21S 10/005* (2013.01); *F21W 2121/00* (2013.01); *F21Y 2115/10* (2016.08)

(58) Field of Classification Search
CPC ........... A47G 2033/0827; F21S 10/005; G02B 6/006; G02B 6/0076; G02B 6/0088; G02B 6/009; F21V 23/02
See application file for complete search history.

(56) References Cited

U.S. PATENT DOCUMENTS

| | | | | |
|---|---|---|---|---|
| 3,694,648 A | * | 9/1972 | Yates | A47G 33/08 362/808 |
| 4,224,364 A | * | 9/1980 | Hunt | A47G 33/08 40/617 |
| 7,341,360 B2 | * | 3/2008 | Richmond | A47G 33/08 362/240 |
| 8,770,776 B1 | * | 7/2014 | Yang | G09F 13/24 362/101 |
| 9,268,083 B1 | * | 2/2016 | Wang | G02B 6/0083 |
| 2006/0120076 A1 | * | 6/2006 | Chen | A47G 33/08 362/231 |
| 2014/0268866 A1 | * | 9/2014 | Yang | G09F 19/00 362/605 |
| 2015/0377455 A1 | * | 12/2015 | Yang | G02B 6/0075 362/101 |
| 2016/0053951 A1 | * | 2/2016 | Wang | F21S 8/035 362/644 |
| 2016/0053955 A1 | * | 2/2016 | Wang | F21S 6/001 362/613 |

* cited by examiner

*Primary Examiner* — Mariceli Santiago
(74) *Attorney, Agent, or Firm* — Leong C. Lei

(57) ABSTRACT

A flashing ornament apparatus includes a housing, a light guiding unit and a circuit module. The light transmissive housing includes an accommodating space formed therein. The light guiding unit includes two light guiding plates arranged inside the accommodating space. The light guiding plates include alternating decorative patterns formed thereon. The circuit module includes a circuit board, at least two light emitting elements and a power source base. The light emitting elements are controlled by the circuit board to be lit up sequentially. The light emitting elements are arranged on one side of the light guiding plates correspondingly in order to allow the light source generated by the light emitting elements to enter into the light guiding plates. Consequently, the flashing visual effect of the decorative patterns can be achieved.

7 Claims, 7 Drawing Sheets

FLASHING ORNAMENT APPARATUS

(a) TECHNICAL FIELD OF THE INVENTION

The present invention is related to an ornament, in particular, to an ornament design used as a visual decoration in an environment and space.

(b) DESCRIPTION OF THE PRIOR ART

With the improvement of living standards nowadays, people's demand for decoration of living environment becomes higher, and typically, during special holidays, certain ornaments are used for decoration in certain occasions for the purpose of making the environment more appealing. However, most of known ornaments are of trivial designs, and to increase the decorative effect and value-added presentation, light emitting elements are used in some known ornaments such that they are able to have distinct decorative effect during both day time and night time. Nevertheless, as the consumer demand becomes higher, most of the basic characteristics of such ornaments fail to satisfy the customer needs, and decisions made by consumers during product purchase are diverse.

Accordingly, after years of research and development along with the experience in the industry, the inventor seeks to provide a novel ornament having a unique design and capable of generating a distinctive visual sensation in order to achieve greater decorative, appealing and entertaining effect.

SUMMARY OF THE INVENTION

A primary objective of the present invention is to provide a flashing ornament design in order to increase the product competitiveness.

Accordingly, the present invention provides a flashing ornament apparatus, comprising:

a light transmissive housing having an accommodating space formed at an internal thereof;

a light guiding unit comprising at least two light guiding plates stacked onto each other and arranged inside the accommodating space; each one of the light guiding plates having a light incident portion arranged on one side thereof, and a surface of each one of the light guiding plates having a decorative pattern formed thereon; each one of the decorative patterns arranged in an alternate manner; and a circuit module comprising a circuit board, at least two light emitting elements and a power source base; each one of the light emitting elements and the power source electrically connected to the circuit board; the power source base configured to receive a battery therein; wherein each one of the lighting emitting elements is controlled by the circuit board to be lit up sequentially; and wherein each one of the light emitting elements is arranged corresponding to the light incident portion of each one of the light guiding plates respectively in order to allow a light generated by each one of the light emitting elements to enter into each one of the light guiding plates from the light incident portion.

According to the aforementioned structure and configuration, the decorative patterns on the light guiding plate surfaces are able to utilize the light emitting elements arranged at one side of the light incident portions to flash sequentially such that the decorative patterns are lit up and off sequentially. As a result, the flashing visual effect can be achieved.

DETAILED DESCRIPTION OF THE PREFERRED EMBODIMENTS

Figure 1:
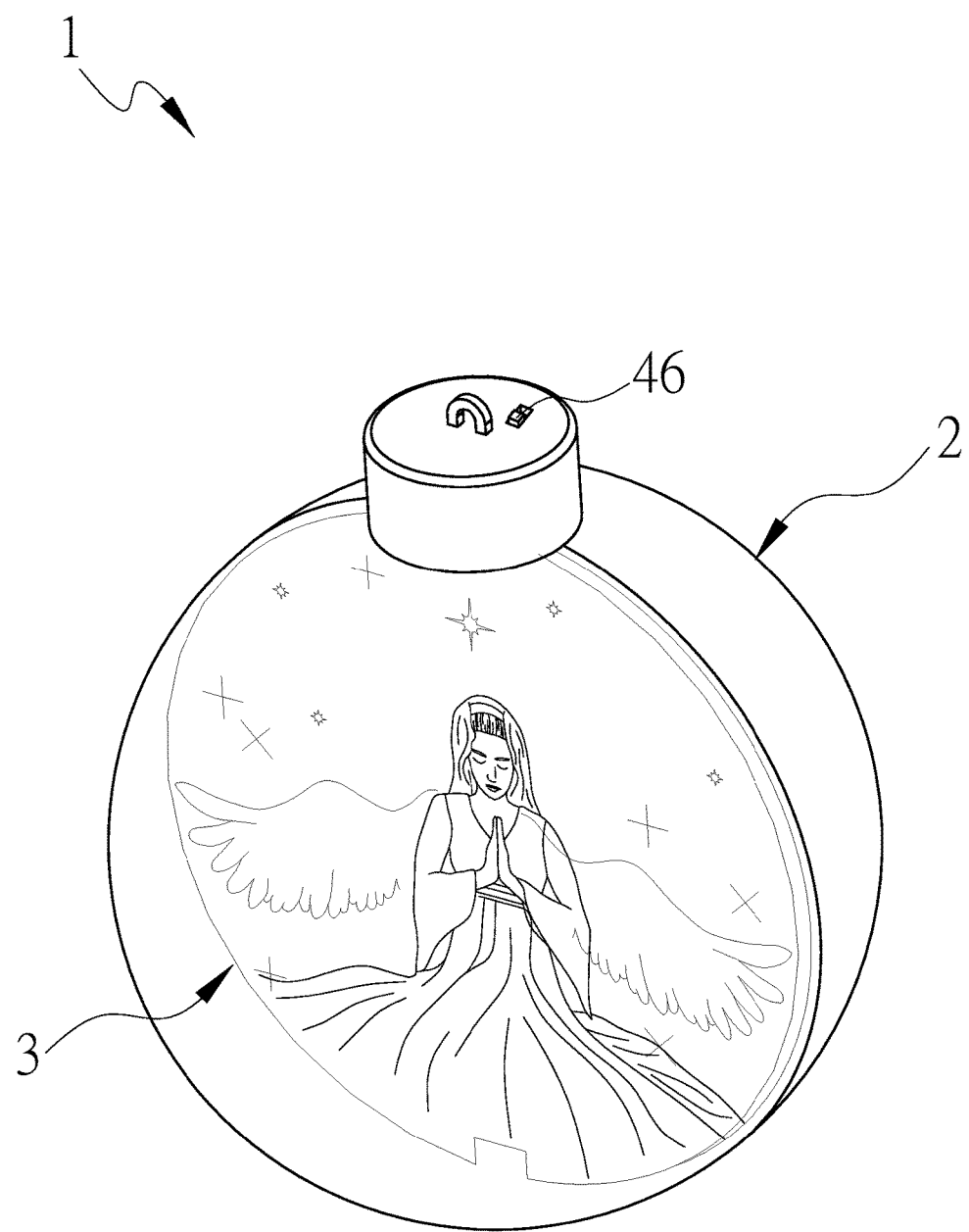
FIG. 1 is a perspective assembly view of a first embodiment of the flashing ornament apparatus of the present invention.
Figure 2:
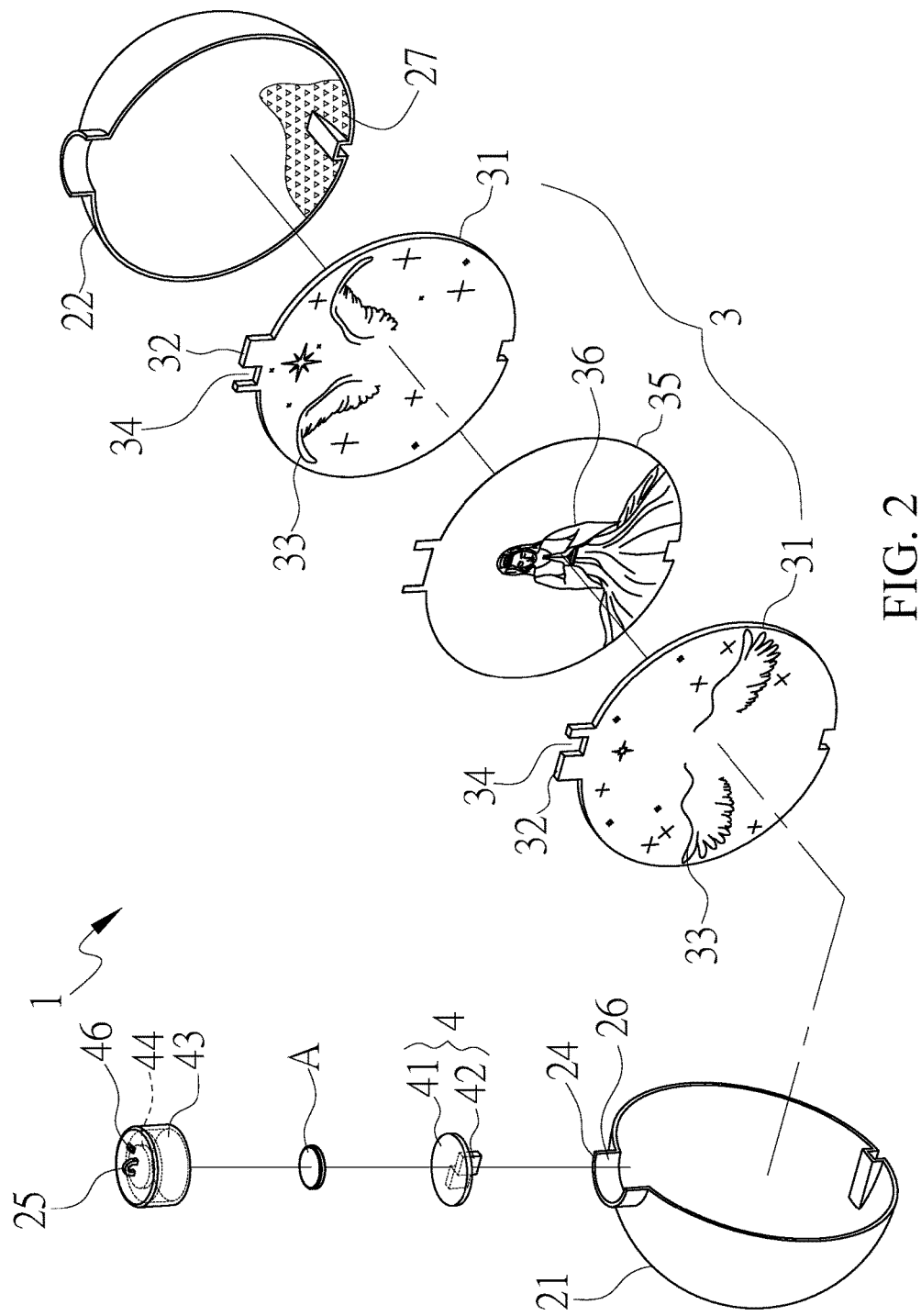
FIG. 2 is an exploded view of the first embodiment of the flashing ornament apparatus of the present invention.
Figure 3:
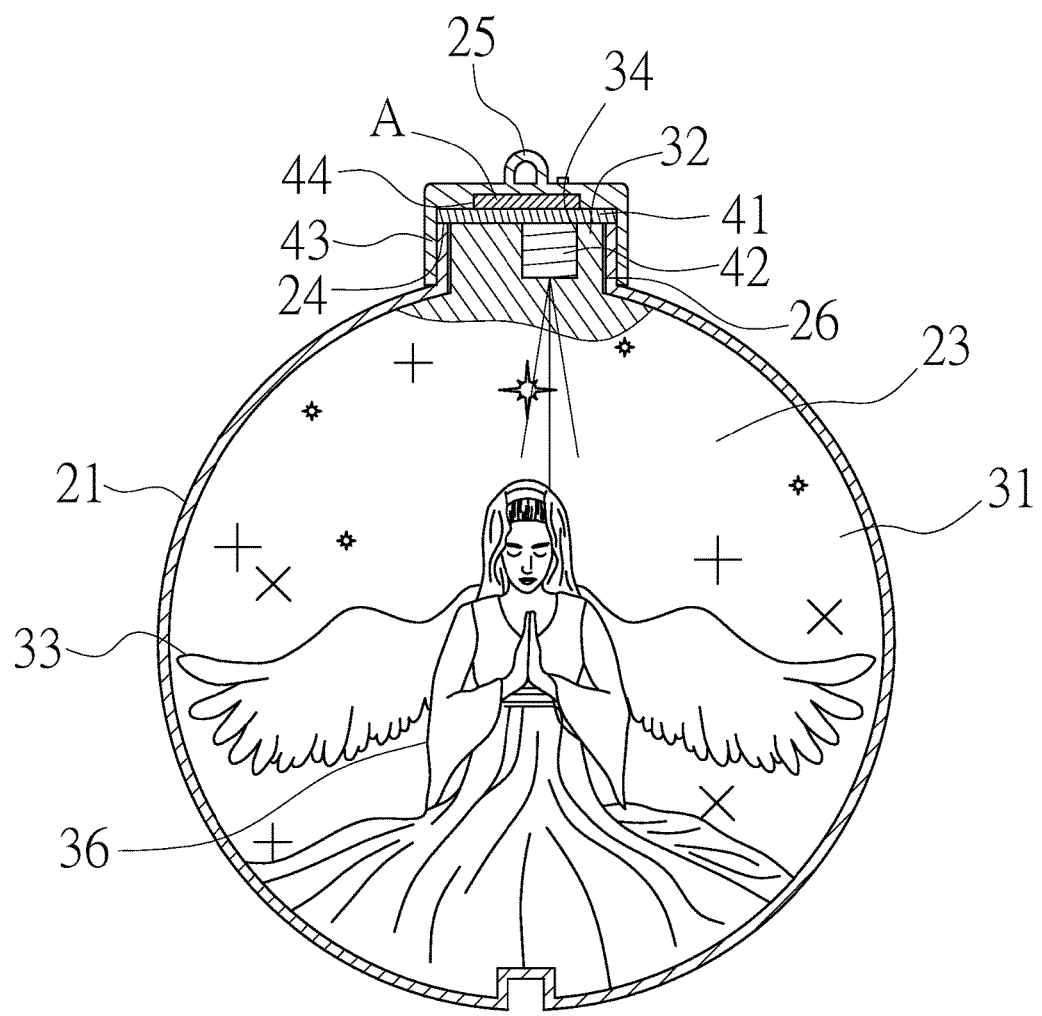
FIG. 3 shows a flashing state of the first embodiment of the flashing ornament apparatus of the present invention.
Figure 4:
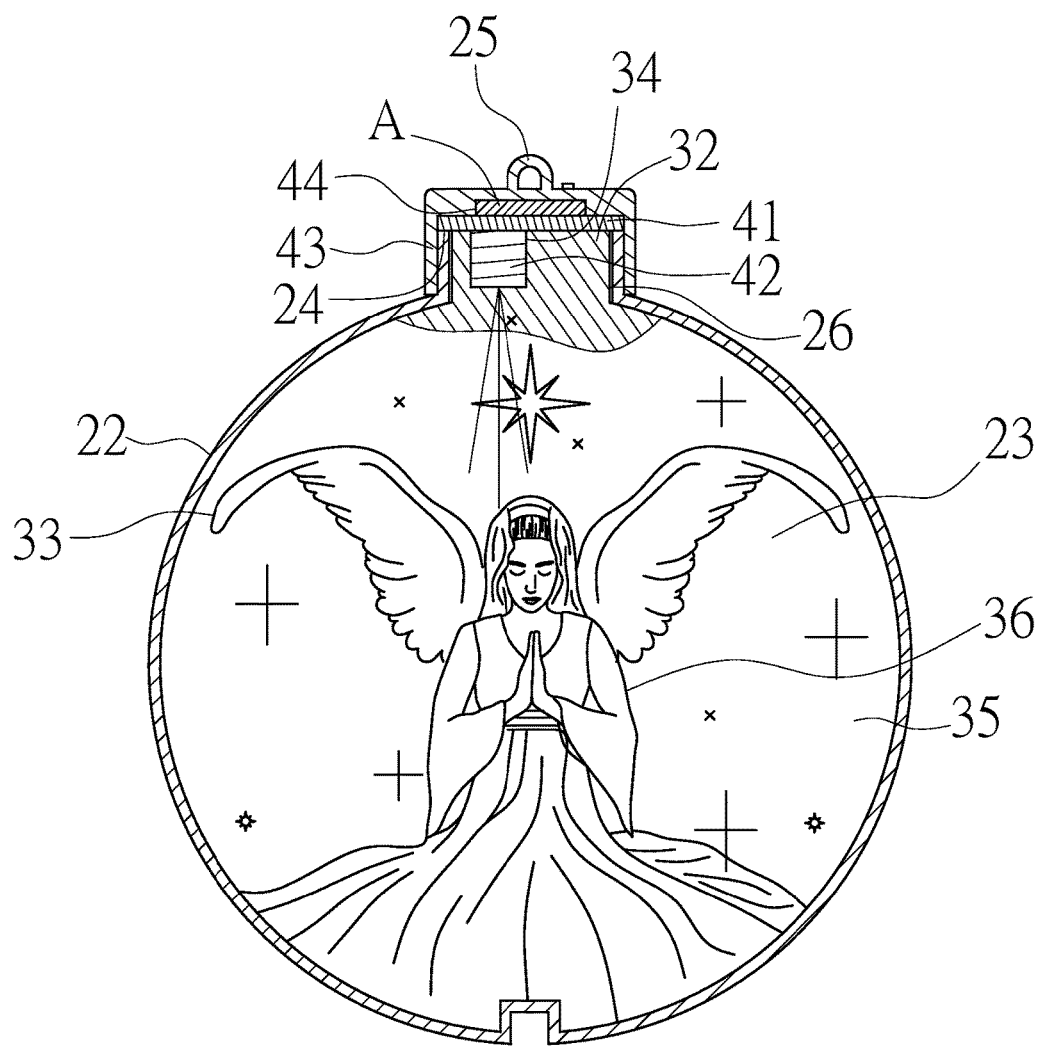
FIG. 4 shows another flashing state of the first embodiment of the flashing ornament apparatus of the present invention.

The following provides a detailed description of a first exemplary embodiment of a flashing ornament apparatus of the present invention along with the accompanied drawings, in which FIG. 1 shows an assembly view of the present invention, FIG. 2 shows an exploded view of the present invention, and FIG. 3 and FIG. 4 show the flashing states of the present invention.

As shown in FIG. 1 to FIG. 4, according to a first embodiment of the present invention, a flashing ornament apparatus (1) mainly comprises: a housing (2), a light guiding unit (3) and a circuit module (4).

The housing (2) comprises a first housing member (21) and a second housing member (22) attached onto each other in order to form an accommodating space (23) therein. The first housing member (21) is light transmissive and includes a top portion having a platform (24) formed thereon. The platform (24) includes an insertion slot (26). In addition, the second housing member (22) can be light transmissive or opaque and includes an insertion slot (26) formed thereon correspondingly. Moreover, an inner edge of the second housing member (22) includes a background pattern (27) formed thereon in order to increase the decorative effect. The background pattern (27) can have a mono color or different colors. In this exemplary embodiment, the outer housing (2) is of a ball shape; however, the present invention is not limited to such shape only.

The light guiding unit (3) is arranged inside the accommodating space (23) and comprises at least two light guiding plates (31) and a light transmissive pattern board (35). The light transmissive pattern board (35) is clamped between the two light guiding plates (31). In this exemplary embodiment, each one of the light guiding plates (31) is of a circular flat plate shape, and one end thereof extends into an light incident portion (32). In addition, a surface of each one of the light guiding plates (31) includes a decorative pattern (33) formed thereon, and a surface of the light transmissive pattern board (35) includes a main pattern (36) formed thereon. The main pattern (36) and the decorative patterns (33) can be formed by any one of a fluorescent paint coating, engraved pattern, surface carving, color printing etc. and a combination thereof, which can be inserted into the insertion slot (26) of the platform (24) with the light incident portions (32) for securement. Furthermore, each one of the light incident portions (32) includes a light slot (34) formed thereon such that the enclosure of the light slot (34) can be utilized to increase the concentration of the light source. The light transmissive pattern board (35) is a thin sheet, and the main pattern (36) on the surface thereof can be a pattern of a theme character or holiday related pattern, and the decorative patterns (33) along with the main pattern (36) together can form a theme pattern.

The circuit module (4) comprises a circuit board (41), at least two light emitting elements (42) and a power source base (43). The light emitting elements (42) and the power source base (43) are electrically connected to the circuit board (41). The power source base (43) is provided to receive a battery (A) therein, and the light emitting elements (42) are LEDs, which can be controlled by the circuit board (41) to be lit up sequentially and to have light color changes. The circuit board (41) is arranged at the platform (24), and each one of the light emitting elements (42) is arranged corresponding to the light slot (34) formed at the light incident portion (32) of each one of the light guiding plates (41) respectively such that it is in contact with the light incident portion (32). In this exemplary embodiment, the power source base (43) is a cover member covering onto an outer edge of the platform (24), and it includes a battery slot (44) for receiving a battery therein; in addition, it includes a top portion having a mounting portion (25) formed thereon. The mounting portion (25) can be a through hole or a mounting hook; wherein the through hole can be provided to allow a string to penetrate therethrough for hanging the ornament apparatus. Furthermore, the circuit module (4) further comprises a switch (46) electrically connected to the power source base (43). The switch (46) is mainly used for conducting or disconnecting the electricity of the power source in order to indirectly control the light on and off of the light emitting elements (42).

According to the above, when the power source is activated, the light emitting elements (42) are controlled by the circuit board (41) to light up and off sequentially. The light source generated by the light emitting elements (42) enters into the light guiding plates (31) from the light incident portions (32). Since the traveling path of the light source generated by the light emitting elements (42) is in a direct projection state, the circumferential edge of the decorative patterns (33) can be lit up. Accordingly, the decorative patterns (33) on the surfaces of the light guiding plates (31) are lit up and off sequentially with the light source, which can cooperate with the main pattern (36) formed on the light transmissive pattern board (35) in order to generate the dynamic flashing effect; thereby, the visual sensation of the present invention is enhanced.

Figure 5:
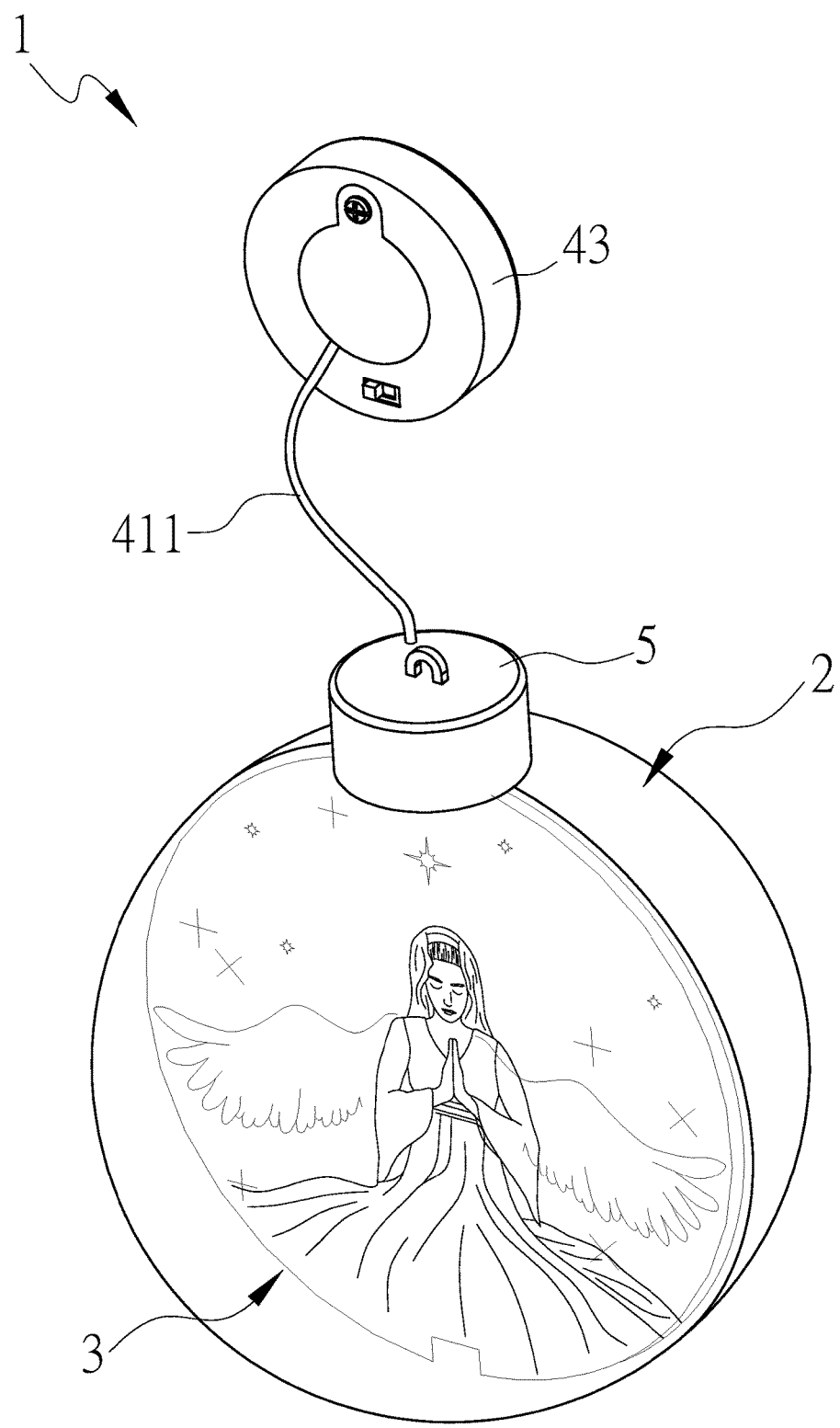
FIG. 5 is a perspective assembly view of a second embodiment of the flashing ornament apparatus of the present invention.
Figure 6:
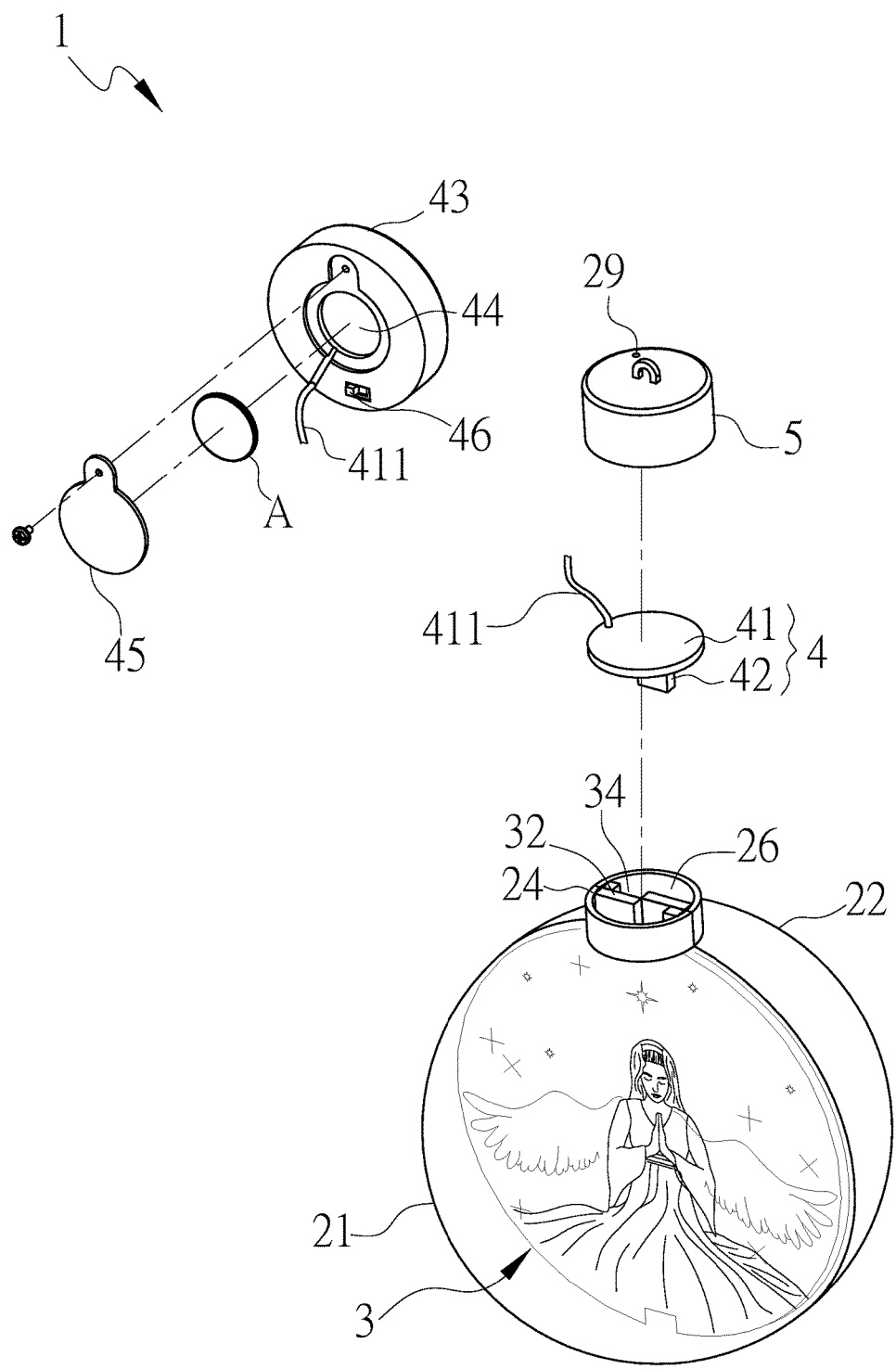
FIG. 6 is a perspective exploded view of the second embodiment of the flashing ornament apparatus of the present invention.
Figure 7:
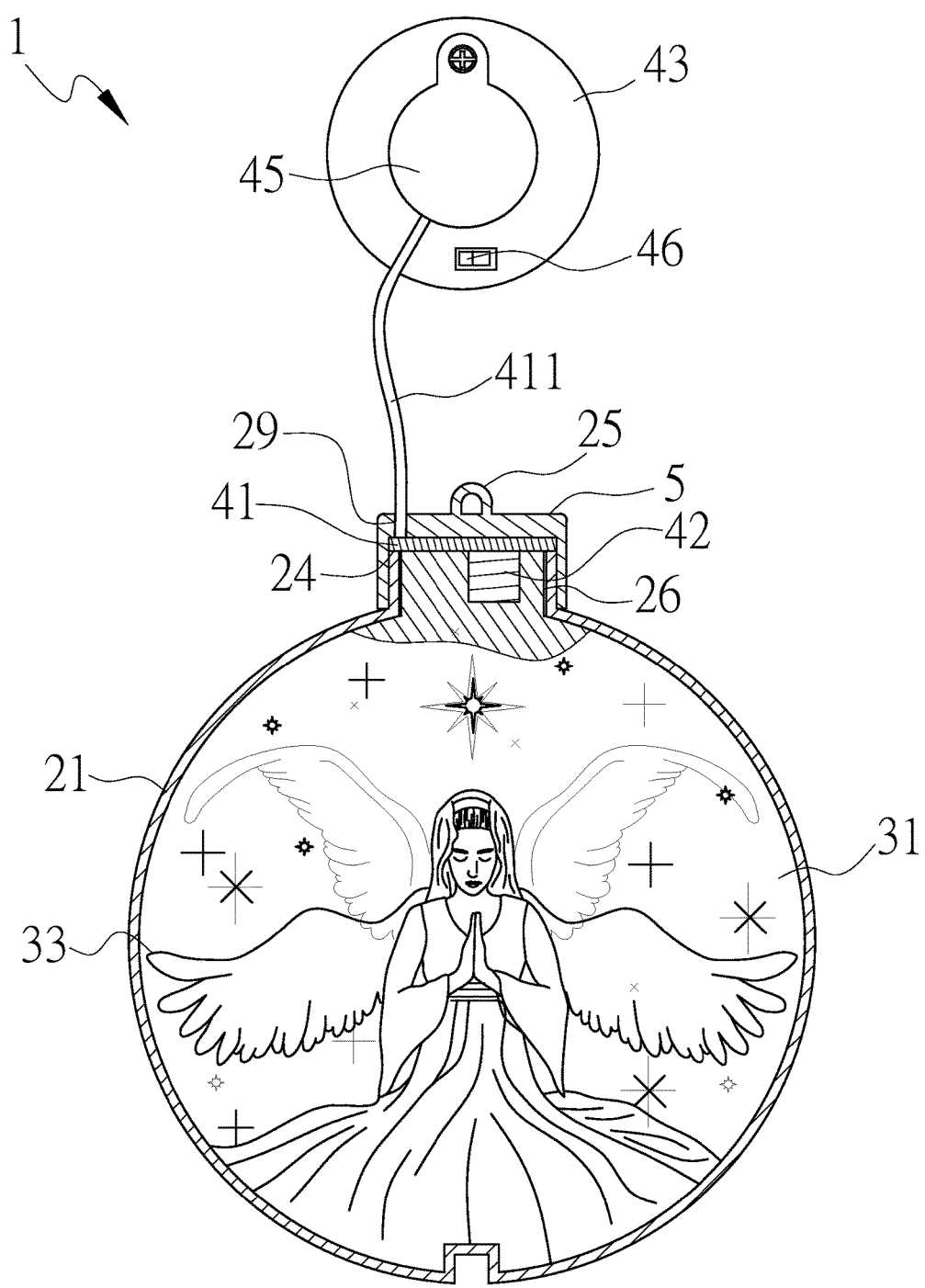
FIG. 7 is a cross sectional view of the second embodiment of the flashing ornament apparatus of the present invention.

Please refer to FIG. 5 to FIG. 7, showing a second embodiment of the flashing ornament apparatus of the present invention. For the second embodiment of the present invention, its structure is modified to be different from the structure of the aforementioned first embodiment of the present invention; therefore, the following provides a description on such differences.

In the second embodiment of the present invention, the flashing ornament apparatus further comprises a shield (5) covering an outer edge of the platform (24). The shield (5) includes a channel (29), and the circuit board (41) includes a wire (411) exposed out of the housing (2) via the channel (29). In addition, the power source base (43) is electrically connected to one end of the exposed wire (411). The power source base (43) comprises a battery slot (44) provided for receiving a battery (A) therein, and it further includes a battery cap (45) for closing the battery slot (44) in order to prevent falling off of the battery (A).

Accordingly, the battery base (43) and the switch (46) are arranged at an external of the housing (2) such that the replacement of battery of the flashing ornament apparatus can be facilitated in this exemplary embodiment in order to increase the product competitiveness.

I claim:

1. A flashing ornament apparatus, comprising:
a light transmissive housing having an accommodating space formed at an internal thereof;
a light guiding unit comprising at least two light guiding plates stacked onto each other and arranged inside the accommodating space; each one of the light guiding plates having a light incident portion arranged on one side thereof, and a surface of each one of the light guiding plates having a decorative pattern formed thereon; each one of the decorative patterns arranged in an alternate manner; and
a circuit module comprising a circuit board, at least two light emitting elements and a power source base; each one of the light emitting elements and the power source electrically connected to the circuit board; the power source base configured to receive a battery therein; wherein each one of the lighting emitting elements is controlled by the circuit board to be lit up sequentially; and wherein each one of the light emitting elements is arranged corresponding to the light incident portion of each one of the light guiding plates respectively in order to allow a light generated by each one of the light emitting elements to enter into each one of the light guiding plates from the light incident portion; thereby, allowing each one of the decorative patterns to show a flashing state;
wherein the housing comprises a first housing member and a second housing member attached onto each other; the first housing member is light transmissive; the first housing member and the second housing member are configured to attach onto each other in order to form a platform on a top portion thereof; the platform includes an insertion slot; the circuit board is secured onto the platform; the light incident portion of each one of the light guiding plates is inserted into the insertion slot.

2. The flashing ornament apparatus according to claim 1, wherein the power source base is a cover member for covering onto an outer edge of the platform.

3. The flashing ornament apparatus according to claim 1, wherein an inner edge of the second housing includes a background pattern formed thereon.

4. The flashing ornament apparatus according to claim 1, further comprising a shield covering an outer edge of the platform; the shield includes a channel formed thereon; the circuit board includes a wire exposed out of the housing via the channel; the power source base is electrically connected to one end of the exposed wire.

5. The flashing ornament apparatus according to claim 1, wherein the decorative pattern is an engraved pattern.

6. The flashing ornament apparatus according to claim 1, wherein the light guiding unit further comprises a light transmissive pattern board; the light transmissive pattern board is arranged between the two light guiding plates, and a surface of the light transmissive pattern board includes a main pattern form thereon.

7. The flashing ornament apparatus according to claim 1, wherein the circuit module further comprises a switch electrically connected to the power source base.

\* \* \* \* \*